United States Patent
Yaron et al.

(10) Patent No.: US 9,191,386 B1
(45) Date of Patent: Nov. 17, 2015

(54) AUTHENTICATION USING ONE-TIME PASSCODE AND PREDEFINED SWIPE PATTERN

(71) Applicant: EMC Corporation, Hopkinton, MA (US)

(72) Inventors: Orit Yaron, Herzliya (IL); David Belder, Hopkinton, MA (US); Asaf Shoval, Rishon Le-Zion (IL)

(73) Assignee: EMC Corporation, Hopkinton, MA (US)

( * ) Notice: Subject to any disclaimer, the term of this patent is extended or adjusted under 35 U.S.C. 154(b) by 15 days.

(21) Appl. No.: 13/716,305

(22) Filed: Dec. 17, 2012

(51) Int. Cl.
*H04L 29/06* (2006.01)
*G06F 21/31* (2013.01)
*H04W 12/06* (2009.01)
*H04L 9/08* (2006.01)

(52) U.S. Cl.
CPC ............ *H04L 63/0838* (2013.01); *G06F 21/31* (2013.01); *H04L 63/0846* (2013.01); *H04W 12/06* (2013.01); *H04L 9/0863* (2013.01)

(58) Field of Classification Search
CPC .............. H04L 63/0838; H04L 9/0863; H04L 63/0846; H04W 12/06; G06F 21/31
USPC ..................... 726/2, 7, 9, 26, 27, 5–6, 18–19; 713/182–185
See application file for complete search history.

(56) References Cited

U.S. PATENT DOCUMENTS

| | | | |
|---|---|---|---|
| 8,245,292 B2 * | 8/2012 | Buer | 726/20 |
| 8,504,842 B1 * | 8/2013 | Meacham | 713/183 |
| 2003/0204726 A1 * | 10/2003 | Kefford et al. | 713/171 |
| 2007/0088952 A1 * | 4/2007 | Hewitt et al. | 713/171 |
| 2007/0180504 A1 * | 8/2007 | Hung | 726/5 |
| 2008/0148057 A1 * | 6/2008 | Hauw | 713/185 |
| 2009/0289916 A1 * | 11/2009 | Dai | 345/173 |
| 2010/0031200 A1 * | 2/2010 | Chen | 715/863 |
| 2010/0242104 A1 * | 9/2010 | Wankmueller et al. | 726/9 |
| 2013/0014248 A1 * | 1/2013 | McLaughlin et al. | 726/17 |

FOREIGN PATENT DOCUMENTS

| | | | | |
|---|---|---|---|---|
| GB | 2433147 A | * | 6/2007 | |
| WO | WO 2011124275 A1 | * | 10/2011 | |
| WO | WO2012001428 A1 | * | 1/2012 | G06F 21/00 |

OTHER PUBLICATIONS

IBM Technical Disclosure Bulletin, Remote Terrminal Computer Communication Security, Dec. 1973, pp. 2312-2314.*

* cited by examiner

*Primary Examiner* — Hadi Armouche
*Assistant Examiner* — Sher A Khan
(74) *Attorney, Agent, or Firm* — Ryan, Mason & Lewis, LLP (57) ABSTRACT

The OTP generator 104 may alternatively be electrically connected to the client-side computing device 102, for example, via a Universal Serial Bus (USB) interface. Further, the OTP generator 104 may alternatively be a server or other type of module that is accessible over the network 110, or it may be a software component resident on the client-side computing device 102. As another alternative, the OTP generator 104 may be distributed over multiple devices, one of which may be the client-side computing device 102.

19 Claims, 3 Drawing Sheets

┌─────────────────────────────────────────────────────┐
│ PRESENT THE USER WITH AN ARRAY OF CHARACTER         │
│ LOCATIONS, THE ARRAY OF CHARACTER LOCATIONS         │
│ CORRESPONDING TO THE ARRAY OF CHARACTERS PRESENTED TO│ — 202
│ THE USER AS A ONE-TIME PASSCODE DURING AUTHENTICATION│
└─────────────────────────────────────────────────────┘
                          ↓
┌─────────────────────────────────────────────────────┐
│ STORE AS THE PREDEFINED SWIPE PATTERN A DIRECTIONAL │
│ PATTERN WITH WHICH THE USER SELECTS AT LEAST A SUBSET OF │ — 204
│ CHARACTERS LOCATIONS FROM THE ARRAY OF CHARACTER LOCATIONS │
└─────────────────────────────────────────────────────┘

┌─────────────────────────────────────────────────────┐
│ RECEIVE AUTHENTICATION INFORMATION FROM A USER, THE │
│ AUTHENTICATION INFORMATION COMPRISING A SEQUENCE    │
│ OF AT LEAST A SUBSET OF CHARACTERS FROM AN ARRAY OF │ — 212
│ CHARACTERS PRESENTED TO THE USER AS A ONE-TIME PASSCODE │
└─────────────────────────────────────────────────────┘
                          ↓
┌─────────────────────────────────────────────────────┐
│ AUTHENTICATE THE USER WHEN THE SEQUENCE ENTERED BY THE USER │ — 214
│ CORRESPONDS TO A PREDEFINED SWIPE PATTERN FOR THE USER │
└─────────────────────────────────────────────────────┘

AUTHENTICATION USING ONE-TIME PASSCODE AND PREDEFINED SWIPE PATTERN

FIELD

The field relates to security techniques, and more particularly to security techniques for improved user authentication.

BACKGROUND

In order to gain access to applications or other resources via a computer or another device, users are often required to authenticate themselves by entering authentication information. Such authentication information may comprise, for example, passcodes that are generated by a security token carried by, or otherwise available to, a user. A passcode may be a one-time passcode (OTP) that is generated using a time-synchronous or event-based algorithm. For example, in the time-synchronous algorithm, the OTP changes at the end of a predetermined time period, e.g., a new OTP is generated by the token every 60 seconds. One particular example of a well-known type of security token is the RSA SecurID® user authentication token commercially available from RSA Security Inc. of Bedford, Mass., U.S.A.

However, as security fraud techniques progress, the use of the traditional OTPs using a security token may not be secure enough for certain security applications. To improve security with the OTP approach, user-known information (such as, e.g., a fixed prefix or suffix of digits or characters representing a password) can be added to the OTP generated by the token. This improvement achieves so-called two-factor authentication (user-known information+OTP). Still, security concerns may exist with respect to the robustness of this particular two-factor authentication approach for certain security applications.

SUMMARY

Embodiments of the invention provide techniques for improved user authentication.

In one embodiment, a method comprises the following steps. Authentication information is received from a user. The authentication information comprises a sequence of at least a subset of characters from an array of characters presented to the user as a one-time passcode. The user is authenticated when the sequence entered by the user corresponds to a predefined swipe pattern for the user.

In another embodiment of the invention, a computer program product is provided which comprises a processor-readable storage medium having encoded therein executable code of one or more software programs. The one or more software programs when executed by one or more computing devices implement steps of the above-described method.

In yet another embodiment of the invention, an apparatus comprises a memory and one or more processors operatively coupled to the memory and configured to perform steps of the above-described method.

In a further embodiment of the invention, a security token comprises a memory and at least one processor coupled to the memory and configured to present to a user an array of characters representing a one-time passcode such that the user is able to enter into a security system authentication information comprising a sequence of at least a subset of characters from the array of characters and to be authenticated when the sequence entered by the user corresponds to a predefined swipe pattern for the user.

Advantageously, embodiments of the invention provide techniques for improving user authentication in the OTP context by incorporating a swipe pattern operation. If also combined with entry of user-known information, a three-factor authentication process is achieved.

These and other features and advantages will become more readily apparent from the accompanying drawings and the following detailed description.

DETAILED DESCRIPTION

Illustrative embodiments of the invention will be described herein with reference to an exemplary system in which a user device (referred to herein as a client-side computing device or endpoint device) communicates with an authentication authority (referred to herein as an authentication manager or server) and one or more additional entities (such as a protected resource). It is to be appreciated, however, that embodiments of the invention are not limited to use in this or any other particular system configuration.

Figure 1A:
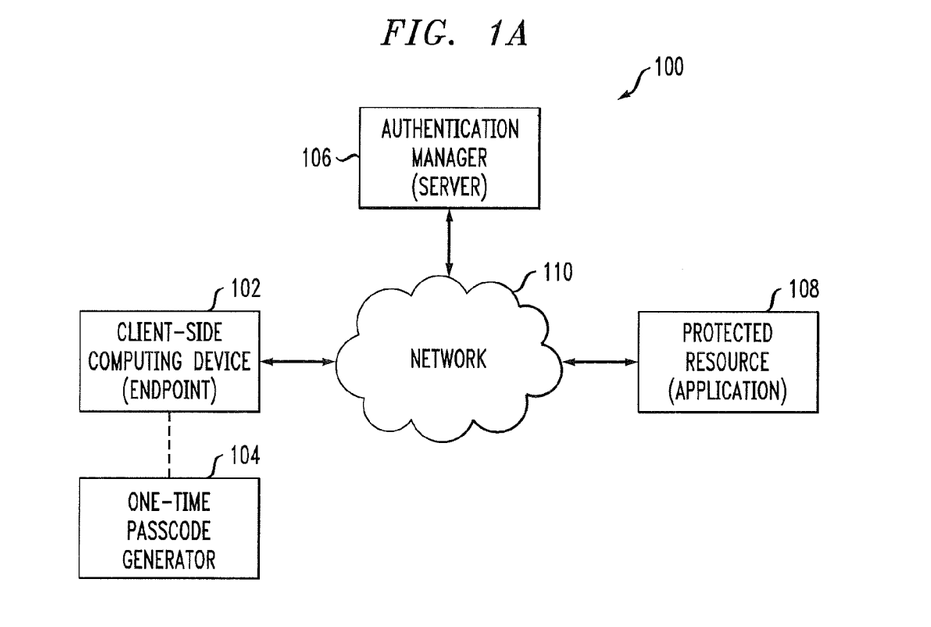
FIG. 1A illustrates a network-based security system in accordance with one embodiment of the invention.

FIG. 1A illustrates a network-based security system 100 with a client-side computing device 102, a one-time passcode generator 104, an authentication manager 106 and a protected resource 108. The client-side computing device 102 communicates with the protected resource 108 over a network 110 during a communication session. Prior to obtaining access to the protected resource 108, the user authenticates with the authentication manager 106 (e.g., in the form of a server), over the network 110, using a one-time passcode (OTP) generated by the one-time passcode generator 104, as will be described in further detail below. The network 110 may comprise, for example, a global computer network such as the Internet, a wide area network (WAN), a local area network (LAN), a satellite network, a telephone or cable network, or various portions or combinations of these and other types of networks.

It is to be appreciated that an embodiment of the invention may comprise multiple instances of the client-side computing device 102, the OTP generator 104, the authentication manager 106, the protected resource 108 and/or other system components not expressly shown, although only single instances of components are shown in FIG. 1A for the sake of clarity of illustration.

As used herein, the term "session" refers to an interactive information interchange. For example, a communication session may be between the client-side computing device 102 and the protected resource 108, between the client-side computing device 102 and the authentication manager 106, between the authentication manager 106 and the protected resource 108, or between all three system components.

The OTP generator 104 is a security token and is shown in FIG. 1A as being separate from the client-side computing device 102. The OTP generator 104 may be implemented, for example, using the RSA SecurID® user authentication token commercially available from RSA Security Inc. of Bedford, Mass., U.S.A., and adapted for use in the security system 100. In such an implementation, the OTP is randomly generated by the OTP generator 104 and presented to the user of the client-side computing device 102 for use in authenticating with the authentication manager 106.

The OTP generator 104 may alternatively be electrically connected the client-side computing device 102, for example, via a Universal Serial Bus (USB) interface. Further, the OTP generator 104 may alternatively be a server or other type of module that is accessible over the network 110, or it may be a software component resident on the client-side computing device 102. As another alternative, the OTP generator 104 may be distributed over multiple devices, one of which may be the client-side computing device 102.

The client-side computing device 102 may comprise a portable device, such as a mobile telephone, personal digital assistant (PDA), wireless email device, game console, etc. The client-side computing device 102 may alternatively comprise a desktop or laptop personal computer (PC), a microcomputer, a workstation, a mainframe computer, a wired telephone, a television set top box, or any other information processing device which can benefit from the use of authentication techniques in accordance with an embodiment of the invention.

The client-side computing device 102 may also be referred to herein as simply a "user." The term "user" should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password, passcode or other authentication information described as being associated with a user may, for example, be associated with client-side computing device 102, a person utilizing or otherwise associated with the device, or a combination of both the person and the device.

The authentication manager 106 is typically associated with a third party entity, such as an authentication authority, that processes authentication requests on behalf of web servers and other resources (e.g., the protected resource 108), and verifies the authentication information that is presented by the client-side computing device 102.

The protected resource 108 may be, for example, an access-controlled application, web site or hardware device. In other words, a protected resource 108 is a resource that grants user access responsive to an authentication process, as will be described in greater detail below. The protected resource 108 may be, for example, a remote application server such as a web site or other software program or hardware device that is accessed by the client-side computing device 102 over the network 110.

Figure 1B:
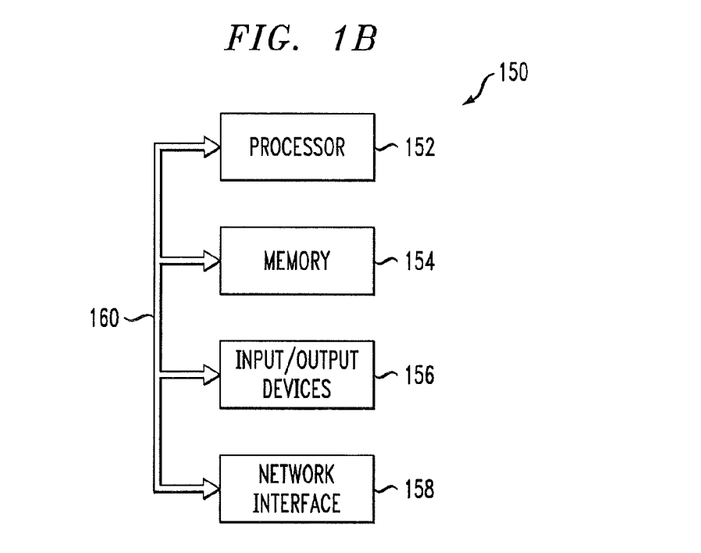
FIG. 1B illustrates a computing device architecture for one or more components of the network-based security system of FIG. 1A.

FIG. 1B illustrates a computing device architecture for one or more components of the network-based security system of FIG. 1A. That is, computing device architecture 150 in FIG. 1B may be respectively implemented by the client-side computing device 102, the OTP generator 104, the authentication manager 106 and the protected resource 108. The computing device architecture 150, as illustrated, comprises a processor 152, a memory 154, input/output devices 156 and network interface 158, all coupled via a bus 160.

The processor 152 may comprise a microprocessor, a microcontroller, an application-specific integrated circuit (ASIC), a field programmable gate array (FPGA) or other type of processing circuitry, as well as portions or combinations of such circuitry elements.

The memory 154 may be viewed as an example of what is more generally referred to herein as a "computer program product." A computer program product comprises a processor-readable storage medium having encoded therein executable code of one or more software programs. Such a memory may comprise electronic memory such as random access memory (RAM), read-only memory (ROM) or other types of memory, in any combination. The computer program code when executed by a processing device such as the processor 152 causes the device to perform functions associated with one or more of the components of the security system 100. One skilled in the art would be readily able to implement such software given the teachings provided herein. Other examples of computer program products embodying embodiments of the invention may include, for example, optical or magnetic disks.

The input/output devices 156 may comprise one or more mechanisms for inputting data to the processor 152 (e.g., keyboard, keypad or pointing device), and one or more mechanisms for providing results or otherwise presenting information associated with the processor 152 (e.g., display, screen or other form of presentation device).

The network interface 158 comprises circuitry that serves to interface the computing device (e.g., client-side computing device 102, authentication manager 106, protected resource 108, etc.) with a network (e.g., network 110) and/or other system components. Such circuitry may comprise conventional transceivers of a type well known in the art.

The computing device architecture 150 may comprise additional known components (not expressly shown) such as parallel processing systems, physical machines, virtual machines, virtual switches, storage volumes, etc. Again, the computing device architecture shown in the figure is presented by way of example only, and security system 100 may include additional or alternative computing architectures, as well as numerous distinct computing architectures in any combination.

Also, numerous other arrangements of servers, computers, storage devices or other components are possible in the security system 100. Such components can communicate with other elements of the security system 100 over any type of network or networks.

Illustrative details of an OTP authentication methodology implemented in the security system 100 according to an embodiment of the invention will now be described with reference to FIGS. 2A through 4.

As mentioned above in the background section, a conventional OTP authentication process may involve the use of an OTP and a piece of user-known information. The conventional process operates as follows. The user, who is trying to authenticate in order to access a protected resource, obtains a randomly generated one-time passcode from a security token the user possesses. The OTP may be generated using a time-synchronous algorithm. For example, in the time-synchronous algorithm, the OTP changes at the end of a predetermined time period, e.g., a new OTP is randomly generated by the token every 60 seconds. The security token (e.g., the RSA SecurID® user authentication token commercially available from RSA Security Inc. of Bedford, Mass., U.S.A.) may present the user with such an OTP in the form of a set of numbers, e.g., '74891328.' The OTP could alternatively be made up of letters, or some combination of numbers and letters.

The user enters this set of numbers along with a piece of user-known information such as a password, e.g., 'apple,' at an authentication web page. For example, the user would enter 'apple74891328' as his/her authentication information when prompted to do so. The authentication authority associated with the protected resource would then authenticate the user based on the authentication information entered. That is, the authentication authority would execute the same time-synchronous algorithm that the user's security token executed such that the authentication authority would verify the user if the OTP generated at the user end matched the expected OTP generated at the authentication authority end. The addition of the password simply adds an additional level of security to the authentication process, wherein the password entered by the user would have to match a password previously registered by the user.

The use of the OTP and the password is considered two-factor authentication, while the use of one or the other of the OTP and the password is considered one-factor authentication. While two-factor authentication is clearly more secure than one-factor authentication, certain applications may desire a greater level of security.

Embodiments of the invention provide such greater level of security by combining the concept of the OTP with a swipe pattern authentication method. In this manner, the credibility of the OTP generated by OTP generator is improved. With the implementation of this improved OTP authentication process, an authenticated user will be one that has the knowledge of the swipe pattern that he/she previously registered along with the specific OTP generated by the OTP generator. If a piece of user-known information (e.g., password) is added to the authentication process, then the authentication process is referred to as three-factor authentication.

Figure 2A:
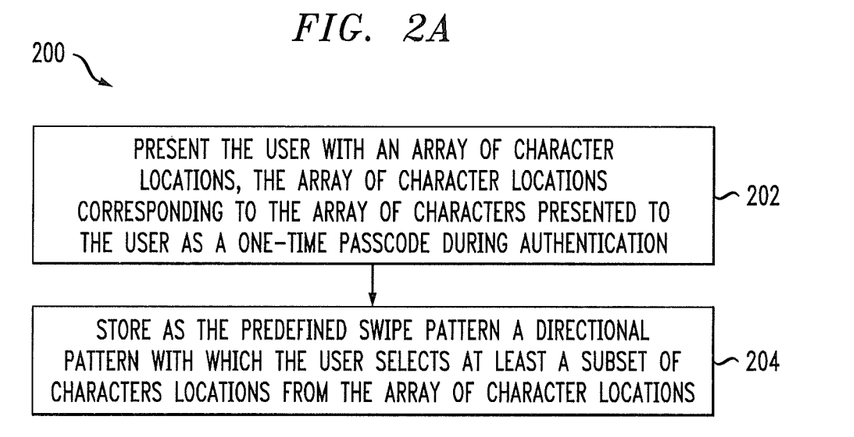
FIG. 2A illustrates a swipe pattern registration methodology in accordance with one embodiment of the invention.

FIG. 2A illustrates a swipe pattern registration methodology in accordance with one embodiment of the invention. Illustrative reference will be made to FIG. 1A, although the swipe pattern registration methodology is not limited to the security system 100. Prior to attempting to access the protected resource 108, the user performs the swipe pattern registration methodology 200 of FIG. 2A. The registration methodology 200 may be performed at the same time the user registers to use a security token such as the OTP generator 104. For example, one or both of the registration processes can be performed at a web site operated by the authentication manager 106. Alternatively, one or both of the registration processes can be performed at a web site operated by the protected resource 108, or some other web site. Thus, registration of the swipe pattern and the security token can be at different times and at different system components.

The swipe pattern registration methodology 200 comprises the following steps. Illustrative reference will be made to FIG. 3 which shows an example of a swipe pattern entry at a swipe pattern entry screen 300. This screen 300 can be presented to the user, through the client-side computing device 102, by the authentication manager 106, the protected resource 108 or some other entity.

Figure 3:
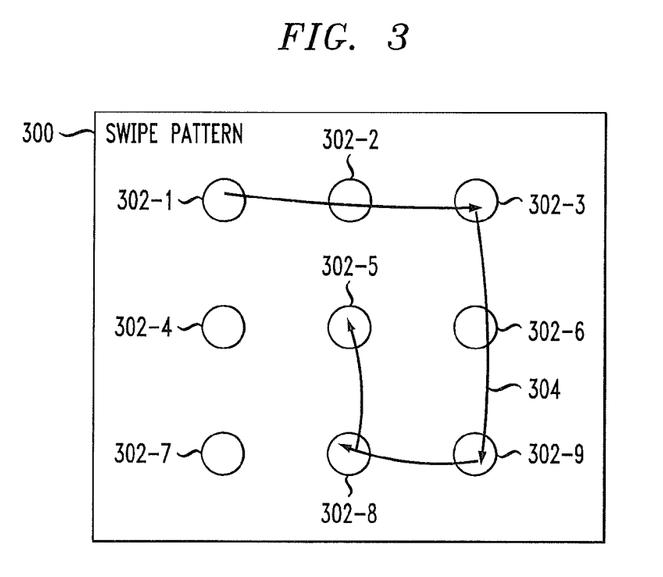
FIG. 3 illustrates a swipe pattern entry during a registration process in accordance with one embodiment of the invention.

On the screen 300, the user is presented with an array of character locations (step 202 of FIG. 2A). In this example, the array is a 3×3 grid (although the concept applies for any N×N grid, or an N×M grid) of character locations 302-1 through 302-9 represented as circles (although any symbol could be used to represent the character locations). As will be explained below, the 3×3 grid of character locations corresponds to an array of characters that will be presented to the user as a one-time passcode via the OTP generator 104 during authentication.

The user then enters a swipe pattern using the 3×3 grid. In one example, it is assumed that the screen on which the 3×3 grid is displayed is a touch screen (however, a pointing device can be used as an alternative). As such, the user places his/her finger or a stylus on a series of character locations 302-1 through 302-9 in a sequence that comprises a directional pattern 304. The selected directional pattern 304 is stored as the swipe pattern (step 204 of FIG. 2A).

In the example shown in FIG. 3, the swipe pattern is the directional pattern 304 comprising character locations 302-1, 302-2, 302-3, 302-6, 302-9, 302-8 and 302-5. Of course, the directional pattern may be formed by a different sequence of character location selections including more or less character locations than the ones shown as 304.

Figure 2B:
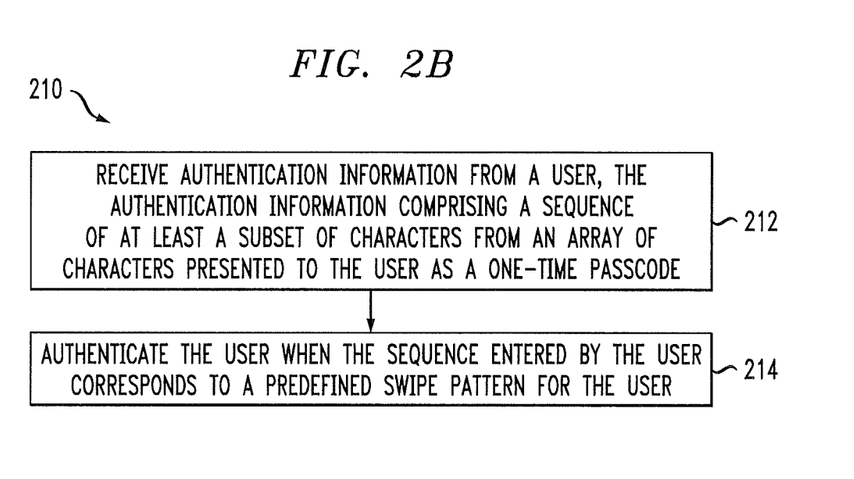
FIG. 2B illustrates a one-time passcode/swipe pattern authentication methodology in accordance with one embodiment of the invention.

FIG. 2B illustrates a one-time passcode/swipe pattern authentication methodology in accordance with one embodiment of the invention. Illustrative reference will be made to FIG. 1A, although the one-time passcode/swipe pattern authentication methodology is not limited to the security system 100. Illustrative reference will also be made to FIG. 4 which shows an example of a one-time passcode generated for use with a swipe pattern operation and presented to the user on a screen 400. This screen 400 is presented to the user via a display of the OTP generator 104, or via a display of the client-side computing device 102 when the OTP generator 104 is connected to or incorporated in the client-side computing device 102.

Figure 4:
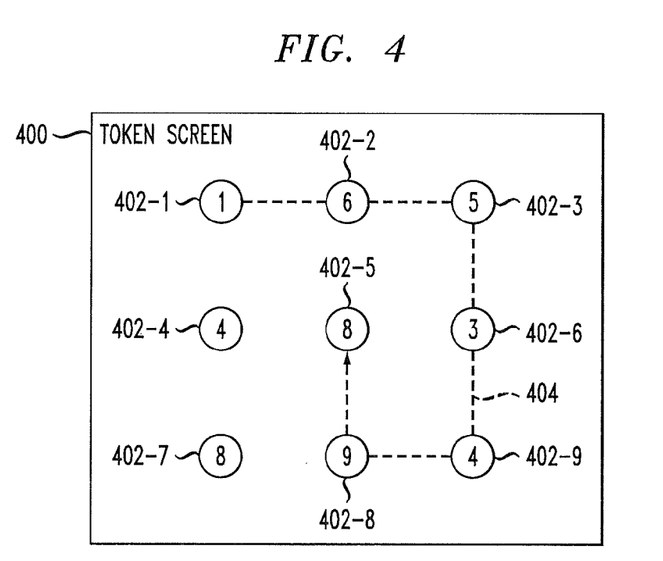
FIG. 4 illustrates a one-time passcode generated for use with a swipe pattern operation in accordance with one embodiment of the invention.

The one-time passcode/swipe pattern authentication methodology 210 is performed as follows. The user is presented with an array of characters that comprises an OTP generated by the OTP generator 104. In this example, the array is a 3×3 grid (although the concept applies for any N×N grid, or an N×M grid) of characters 402-1 through 402-9. The characters in this example are numbers. However, in an alternative embodiment, the characters can be letters or some combination of numbers and letters. As mentioned above, the 3×3 grid of characters corresponds to the 3×3 grid of character locations in screen 300 presented to the user during the swipe pattern registration methodology 200 described above.

Note that the array of characters 402-1 through 402-9 is randomly generated by the OTP generator 104. This means that the specific character shown at each element of the grid is randomly generated. When using a time-synchronous algorithm, a new array of characters is generated at the end of a predetermined time period, e.g., a new array of characters is generated by the OTP generator 104 every 60 seconds. In an event-based algorithm, an event occurrence triggers the generation of a new OTP (array of characters).

In step 212 of the authentication methodology, the user enters his/her authentication information via the client-side computing device 102, which is received by the authentication manager 106 (either directly through an authentication web page presented by the authentication manager 106 or through an authentication web page presented by the protected resource 108). In accordance with this embodiment, the authentication information comprises a sequence of at least a subset of characters from the 3×3 grid presented to the user. The sequence that the user enters comprises the characters that are at the locations in the 3×3 grid that correspond to the swipe pattern predefined during registration in FIG. 2A. Recall directional pattern 304 in FIG. 3, which is shown in phantom view as dashed line 404 in FIG. 4 (note that dashed line 404 is not displayed on the screen 400 to the user but is only shown in the figure for purposes of clarity of explanation). So in the OTP example in FIG. 4, the sequence that the user enters and the authentication manager 106 receives is '1653498' corresponding to array characters 402-1, 402-2, 402-3, 402-6, 402-9, 402-8 and 402-5 (which correspond to character locations 302-1, 302-2, 302-3, 302-6, 302-9, 302-8 and 302-5 in FIG. 3). The assumption is that the user remembers the swipe pattern he/she previously registered (predefined) so that he/she can enter the characters from the presented OTP in the same sequence as the swipe pattern.

Thus, in step 214, the user is authenticated when the sequence entered by the user corresponds to the predefined swipe pattern for the user. This assumes that the authentication manager 106 also generated the same OTP (3×3 grid) presented to the user and has the users predefined swipe pattern, and therefore can verify that the sequence of the characters is consistent. When there is a match, the authentication manager 106 indicates an "accept" to the protected resource 108. The user can then access the protected resource 108. If there is no match, then the authentication manager 106 indicates a "reject" to the protected resource 108. The user is not given access to the protected resource 108.

As mentioned above, a password (user-known information) can be added to the authentication process to make the authentication process a three-factor authentication.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
performing registration of a given user for multi-factor authentication, wherein registration of the given user comprises:
registering a password as a first authentication factor for the given user;
registering a security token, configured to generate one-time passcodes, as a second authentication factor for the given user;
registering a swipe pattern as a third authentication factor for the given user, wherein registering the swipe pattern comprises:
presenting the given user with an array of character locations; and
storing, as the swipe pattern, a directional pattern of a subset of at least two of the character locations in the array;
performing multi-factor authentication of the given user to authenticate access to a protected resource, wherein multi-factor authentication of the given user comprises:
receiving authentication information from the given user during a given authentication session;
identifying, in the received authentication information, a first portion and a second portion;
verifying the first authentication factor by matching the first portion of the received authentication information to the previously-registered password for the given user; and
verifying the second and third authentication factors by:
generating a given one-time passcode, the given one-time passcode comprising a set of characters, wherein each of the characters in the set is associated with a corresponding respective one of the array of character locations presented to the given user;
determining an expected sequence of characters in the given one-time passcode based on the stored swipe pattern for the given user; and
matching the second portion of the received authentication information to the expected sequence of characters in the given one-time passcode;
wherein registering the security token as the second authentication factor is performed at a first time using a first web site and registering the swipe pattern as the third authentication factor is performed at a second time different than the first time using a second web site different than the first web site;
wherein at least one of the first web site and the second web site is operated by at least one of an authentication manager and the protected resource;
wherein the set of characters presented to the given user as the given one-time passcode is re-generated by the security token responsive to at least one of expiration of a predefined time period and incrementing an event counter; and
wherein the method is performed by at least one computing device.

2. The method of claim 1, wherein the given one-time passcode is presented to the given user via a display of the security token.

3. The method of claim 1, wherein the given one-time passcode is presented to the given user via a display of a client-side computing device connected to the security token.

4. The method of claim 1, wherein the given one-time passcode is presented to the given user via a display of a client-side computing device incorporating the security token.

5. The method of claim 1, wherein the array of character locations comprises a grid of character locations and the swipe pattern comprises a directional contiguous sequence of character locations in the grid.

6. The method of claim 1, wherein the given one-time passcode is generated in accordance with a time-synchronous algorithm known to the at least one computing device and the security token.

7. The method of claim 1, wherein the given one-time passcode is generated in accordance with an event-synchronous algorithm known to the at least one computing device and the security token.

8. The method of claim 1, wherein said at least one computing device comprises the authentication manager.

9. The method of claim 1, wherein the authentication manager is distinct from the protected resource.

10. The method of claim 1, wherein at least two of the characters in the given one-time passcode have the same value.

11. A computer program product comprising a non-transitory processor-readable storage medium having encoded therein executable code of one or more software programs, wherein the one or more software programs when executed by at least one computing device causes the at least one computing device to:

perform registration of a given user for multi-factor authentication, wherein registration of the given user comprises:

registering a password as a first authentication factor for the given user;

registering a security token, configured to generate one-time passcodes, as a second authentication factor for the given user;

registering a swipe pattern as a third authentication factor for the given user, wherein registering the swipe pattern comprises:

presenting the given user with an array of character locations; and storing, as the swipe pattern, a directional pattern of a subset of at least two of the character locations in the array;

perform multi-factor authentication of the given user to authenticate access to a protected resource, wherein multi-factor authentication of the given user comprises:

receiving authentication information from the given user during a given authentication session;

identifying, in the received authentication information, a first portion and a second portion;

verifying the first authentication factor by matching the first portion of the received authentication information to the previously-registered password for the given user; and verifying the second and third authentication factors by:

generating a given one-time passcode, the given one-time passcode comprising a set of characters, wherein each of the characters in the set is associated with a corresponding respective one of the array of character locations presented to the given user;

determining an expected sequence of characters in the given one-time passcode based on the stored swipe pattern for the given user; and matching the second portion of the received authentication information to the expected sequence of characters in the given one-time passcode;

wherein registering the security token as the second authentication factor is performed at a first time using a first web site and registering the swipe pattern as the third authentication factor is performed at a second time different than the first time using a second web site different than the first web site;

wherein at least one of the first web site and the second web site is operated by at least one of an authentication manager and the protected resource; and wherein the set of characters presented to the given user as the given one-time passcode is re-generated by the security token responsive to at least one of expiration of a predefined time period and incrementing an event counter.

12. The computer program product of claim 11, wherein the given one-time passcode is presented to the given user via a display of the security token.

13. The computer program product of claim 11, wherein the given one-time passcode is presented to the given user via a display of a client-side computing device connected to the security token.

14. The computer program product of claim 11, wherein the given one-time passcode is presented to the given user via a display of a client-side computing device incorporating the security token.

15. The computer program product of claim 11, wherein the array of character locations comprises a grid of character locations and the swipe pattern comprises a directional contiguous sequence of character locations in the grid.

16. The computer program product of claim 11, wherein the given one-time passcode is generated in accordance with a time-synchronous algorithm known to the at least one computing device and the security token.

17. The computer program product of claim 11, wherein the given one-time passcode is generated in accordance with an event-synchronous algorithm known to the at least one computing device and the security token.

18. The computer program product of claim 11, wherein the authentication manager is distinct from the protected resource.

19. An apparatus, comprising:

a memory; and one or more processors operatively coupled to the memory and configured to:

perform registration of a given user for multi-factor authentication, wherein registration of the given user comprises:

registering a password as a first authentication factor for the given user;

registering a security token, configured to generate one-time passcodes, as a second authentication factor for the given user;

registering a swipe pattern as a third authentication factor for the given user, wherein registering the swipe pattern comprises:

presenting the given user with an array of character locations; and storing, as the swipe pattern, a directional pattern of a subset of at least two of the character locations in the array;

perform multi-factor authentication of the given user to authenticate access to a protected resource, wherein multi-factor authentication of the given user comprises:

receiving authentication information from the given user during a given authentication session;

identifying, in the received authentication information, a first portion and a second portion;

verifying the first authentication factor by matching the first portion of the received authentication information to the previously-registered password for the given user; and verifying the second and third authentication factors by:

generating a given one-time passcode, the given one-time passcode comprising a set of characters, wherein each of the characters in the set is associated with a corresponding respective one of the array of character locations presented to the given user;

determining an expected sequence of characters in the given one-time passcode based on the stored swipe pattern for the given user; and matching the second portion of the received authentication information to the expected sequence of characters in the given one-time passcode;

wherein registering the security token as the second authentication factor is performed at a first time using a first web site and registering the swipe pattern as the third authentication factor is performed at a second time different than the first time using a second web site different than the first web site;

wherein at least one of the first web site and the second web site is operated by at least one of an authentication manager and the protected resource; and wherein the set of characters presented to the given user as the given one-time passcode is re-generated by the security token responsive to at least one of expiration of a predefined time period and incrementing an event counter.

\* \* \* \* \*

UNITED STATES PATENT AND TRADEMARK OFFICE
CERTIFICATE OF CORRECTION

| | | |
|---|---|---|
| PATENT NO. | : 9,191,386 B1 | Page 1 of 1 |
| APPLICATION NO. | : 13/716305 | |
| DATED | : November 17, 2015 | |
| INVENTOR(S) | : Orit Yaron et al. | |

It is certified that error appears in the above-identified patent and that said Letters Patent is hereby corrected as shown below:

On the title page of the issued patent, Item 57 in the ABSTRACT, please delete the abstract and insert the following:

--Techniques for improved user authentication. In one example, a method comprises the following steps. Authentication information is received from a user. The authentication information comprises a sequence of at least a subset of characters from an array of characters presented to the user as a one-time passcode. The user is authenticated when the sequence entered by the user corresponds to a predefined swipe pattern for the user.--.

In the specification

At col. 3, line 14, after the word "connected" please insert --to--.

Signed and Sealed this
Twenty-fourth Day of May, 2016

Michelle K. Lee
*Director of the United States Patent and Trademark Office*